United States Patent
Lu et al.

(10) Patent No.: US 11,802,376 B2
(45) Date of Patent: Oct. 31, 2023

(54) PAPER STRENGTH IMPROVING ADDITIVES, THEIR MANUFACTURE AND USE IN PAPER MAKING

(71) Applicant: KEMIRA OYJ, Helsinki (FI)

(72) Inventors: Chen Lu, Marietta, GA (US); Jenna Rabideau, Rydal, GA (US)

(73) Assignee: KEMIRA OYJ, Helsenki (FI)

( * ) Notice: Subject to any disclaimer, the term of this patent is extended or adjusted under 35 U.S.C. 154(b) by 355 days.

(21) Appl. No.: 17/055,145

(22) PCT Filed: May 14, 2018

(86) PCT No.: PCT/US2018/032509
§ 371 (c)(1),
(2) Date: Nov. 13, 2020

(87) PCT Pub. No.: WO2019/221694
PCT Pub. Date: Nov. 21, 2019

(65) Prior Publication Data
US 2021/0222368 A1    Jul. 22, 2021

(51) Int. Cl.
| | |
|---|---|
| *D21H 17/20* | (2006.01) |
| *D21H 17/30* | (2006.01) |
| *C08B 31/00* | (2006.01) |
| *C08B 37/00* | (2006.01) |
| *C08L 1/08* | (2006.01) |
| *C08L 3/04* | (2006.01) |
| *C08L 5/04* | (2006.01) |
| *D21H 17/25* | (2006.01) |
| *D21H 17/28* | (2006.01) |
| *D21H 17/37* | (2006.01) |
| *D21H 21/18* | (2006.01) |

(52) U.S. Cl.
CPC .......... *D21H 17/30* (2013.01); *C08B 31/003* (2013.01); *C08B 37/0084* (2013.01); *C08L 1/08* (2013.01); *C08L 3/04* (2013.01); *C08L 5/04* (2013.01); *D21H 17/25* (2013.01); *D21H 17/28* (2013.01); *D21H 17/375* (2013.01); *D21H 21/18* (2013.01)

(58) Field of Classification Search
CPC ..... C08L 3/04; C08L 1/08; C08L 5/04; C08B 15/00; C08B 31/00; C08B 37/00; D21H 17/24; D21H 17/25; D21H 17/28; D21H 17/30; D21H 17/32; D21H 21/18
USPC ...................................................... 162/168.3
See application file for complete search history.

(56) References Cited

U.S. PATENT DOCUMENTS

| | | | |
|---|---|---|---|
| 3,513,120 | A | 5/1970 | Pohlemann et al. |
| 4,265,796 | A | 5/1981 | Mueller-Mall et al. |
| 4,393,202 | A | 7/1983 | Breuninger |
| 5,338,407 | A | 8/1994 | Dasgupta |
| 6,746,542 | B1 | 6/2004 | Lorencak et al. |
| 2012/0295833 | A1 | 11/2012 | Charvet et al. |

FOREIGN PATENT DOCUMENTS

WO    2013026578    2/2013

*Primary Examiner* — Mark Halpern
(74) *Attorney, Agent, or Firm* — Robin L. Teskin; Baker, Donelson, Bearman, Caldwell & Berkowitz PC

(57) ABSTRACT

The present invention relates to a polymer composition comprising an anionic polymer composite having a synthesized polymer portion and a polysaccharide portion, obtainable by polymerizing vinyl monomers in the presence of the polysaccharide. The present invention further relates to a strength system and methods of production and use in providing a paper product.

12 Claims, No Drawings

PAPER STRENGTH IMPROVING ADDITIVES, THEIR MANUFACTURE AND USE IN PAPER MAKING

RELATED APPLICATIONS

This application is a U.S. National Phase application of International Application No. PCT/US2018/032509, filed May 14, 2018, which is incorporated herein by reference.

FIELD OF THE INVENTION

The present invention relates to a polymer composition, strength systems and their production and use for enhancing the strength of a paper product.

BACKGROUND

In the manufacturing of paper grades which come into contact with moist or water during processing or use, for example towel, facial, and certain packaging paper grades, wet strength additives are widely added to the pulp suspension to provide wet strength to the paper product. This is because an untreated cellulose fiber web will typically lose 95-97% of its strength when saturated with water. The term "wet strength" refers to the strength of finished paper or paperboard after it has been rewetted by water. Wet strength may be of temporary or permanent nature. A paper product which when placed in an aqueous medium retains a substantial portion of its initial wet strength over time is regarded to have good permanent wet strength. On the other hand, a paper product for which wet strength is sufficient for the intended use, but which then decays over time upon soaking in water, is regarded to have good temporary wet strength. A common permanent wet strength additive is polyamidoamine epichlorohydrin (PAE). PAE are often applied in rather high dosages which can cause many production operation issues.

Most bleached virgin pulps have low conductivity and low cationic demand. However, commercial wet strength PAE resins have a high cationic charge density, typically around 2 meq/g. Consequently, the high dosages of PAE resins required for providing the desired wet strength often convert the net charge of pulp suspension from anionic to cationic, resulting in poor PAE retention and low PAE efficiency. In addition, the un-retained PAE resin accumulates in the water system, leading to poor drainage, wire and felt plugging, sheet defects and breaks, and increased foaming requiring higher defoamer usage. Excessive un-retained PAE resin may cause deposits at later stages of the paper production, e.g. on the Yankee surface and harden crepe coating, resulting in poor creping performance. Furthermore, plugged felts produce high moisture streaks, which in turn strip crepe coating. See e.g. the publication by Clay Campbell, Chen Lu, Junhua Chen, Adrian Stuart, Towel/Facial Wet End Optimization: Utilizing Strength Additives and Functional Promoters, Tissue World, August/September, 2012.

See e.g. the publication by Clay Campbell, Chen Lu, Junhua Chen, Adrian Stuart, Towel/Facial Wet End Optimization: Utilizing Strength Additives and Functional Promoters, Tissue World, August/September, 2012.

Carboxymethyl cellulose (CMC) has been used in the past together with PAE resins but this combination has limitations. CMC provides wet and dry tensile strength improvement. In addition, CMC normally carries relatively high anionic charge density and can effectively convert pulp suspensions to have negative charge. However, commercial CMC products are delivered in dry form and costly make-down units are needed before any application. In many cases, the make-down process is incomplete or inconsistent; leading to partially hydrated CMC, poor strength development, and plugged filters. Additionally, CMC is prone to microbiological growth.

U.S. Pat. Nos. 3,049,469 and 6,939,443 disclose that synthetic copolymers of acrylamide and acrylic acid obtained by solution polymerization are used as an alternative to CMC if an easy-to-handle solution product is required by the paper producer. Solution polymerization products are provided in liquid form and mix easily with dilution water. There is no need for either an expensive make-down unit or an extra post-dilution aging tank. However, synthetic polymers do not provide comparable strength development as CMC at similar cost. Furthermore, synthetic products have a narrow operating window and only provide optimal strength performance at narrow weight ratios of synthetic anionic polymer/PAE. If the ratio is too high or too low, the strength properties will decrease significantly.

There is a need to minimize the problems raised above and improve the overall production of papers. Consequently, a more cost-effective and easy-to-handle product is still highly desired by many paper producers.

There is a need for new ways of making paper to provide maintained or improved paper attributes such as strength, while improving the operation of the paper machine. It is also desirable to provide more environmentally friendly ways for production of paper.

SUMMARY OF THE INVENTION

According to one aspect of the present invention, there is provided a new polymer composition comprising an anionic polymer composite having a synthesized polymer portion and an anionic polysaccharide portion, obtainable by polymerizing vinyl monomers in the presence of an anionic polysaccharide. The vinyl monomers may be selected so as to provide nonionic units and anionic units to the synthesized polymer portion. This new anionic polymer product show superior strength performance compared to the conventional anionic polyacrylamide. When the present anionic polymer product is used in papermaking it has been found to provide improved wet and/or dry tensile strength to a paper product compared to conventional synthetic anionic solution polymerization products. It seems like when the present polymer composition comprising the anionic polymer composite is added in a papermaking process it's structure aids in retention and strength provision. The anionic polymer product may also be used together with other strength increasing components in the paper making process at the same or different positions of the process, such as cationic additives, e.g. cationic reactive strength additives. The wet and/or dry strength may be further improved by a combined use of the present anionic polymer product and other strength improving additives. It seems like when the present polymer composition is added in a papermaking process and also a cationic additive is added to said process, the combination seems to further boost retention and strength provision.

According to one embodiment the present polymer composition provides a solution-based anionic promoter for a cationic additive, such as a cationic reactive strength additive. This polymer composition delivered significantly higher wet and dry tensile strength to a paper product than a conventional synthetic anionic solution polymerization product. Furthermore, the new polymer composition has a broad operating window, and the improved paper strength properties can be achieved over a wide weight range of said cationic additive, e.g. cationic reactive strength additive, to the anionic promoter.

The new polymer composition, when used with a cationic additive (e.g. cationic reactive strength additive), facilitates improved fixation of the cationic additive to the fibers, and allows increasing its dosage. Although the new polymer composition is aimed for improving paper strength properties, it may also be used for maintaining desired strength properties e.g. while reducing the paper product gram mage or increasing filler amount, that are known to decrease paper strength.

DETAILED DESCRIPTION

The present invention relates to a polymer composition obtainable by polymerizing vinyl monomers in the presence of an anionic polysaccharide, typically in an aqueous solution of the anionic polysaccharide, wherein the vinyl monomers may provide nonionic units and anionic units to the synthesized polymer portion. In this way, a stable aqueous polymer composition is obtainable that comprises a synthesized polymer portion and an anionic polysaccharide portion that are non-separable from each other, i.e. an anionic polymer composite.

The wording synthesized polymer as used herein is to be interpreted as the synthesized polymer portion.

As used herein, an aqueous polymer composition is meant to cover also an aqueous dispersion, including e.g. solutions that may contain minor amounts of incompletely dissolved or partially dissolved material, or undissolved or incompletely dissolved residues. Thus, the wording aqueous polymer composition is herein to be interpreted as either a solution or dispersion thereof. Without wishing to be bound by any theory it is believed that the stability of the obtained polymer composition is due to the high physical entanglement and interlacing of the polymer chains, further stabilized by hydrogen bonds and van der Waals forces. Polymerizing vinyl monomers in the presence of the anionic polysaccharide provides a different structure and arrangement of the polymer chains in the obtained polymer composition. This structure and arrangement of the polymer chains may have a contribution to the improved strength performance of the present polymer composition. Additionally, the present polymer composition is microbiologically more stable than e.g. CMC, as aqueous solutions, so performance losses due to microbiological deterioration are minimized.

The polymer composition of the present invention may have a solids content originating from the anionic polymer composite of about 1-50 wt %, preferably about 5-50 wt %, more preferably about 10-30 wt %, based on the total weight of the polymer composition. Preferably only the anionic polymer composite provides the solids to the present polymer composition, to provide the solids content thereof.

Polymer compositions having solids contents within these ranges are easy to pump and dilute without special and costly equipment. Furthermore, polymer compositions having solids contents within these ranges can be delivered to the customers at a reasonable shipping cost.

During polymerization of the vinyl monomers, the anionic polysaccharide is preferably present in the form of an aqueous solution. As used herein, an aqueous solution of a polysaccharide is meant to cover also an aqueous dispersion of a polysaccharide, including e.g. solutions that may contain minor amounts of incompletely dissolved or partially dissolved material, or undissolved or incompletely dissolved residues. Thus, the wording aqueous solution of a polysaccharide may be interpreted as either a solution or dispersion thereof.

The general definition applies to the aqueous solutions of the polymer composition as well as to aqueous solutions of anionic polysaccharide, if not otherwise indicated herein. Preferably the aqueous solutions contain less than 5 weight-%, preferably less than 2 weight-%, more preferably less than 1 weight-%, of insoluble material, or they are free from insoluble material.

As used herein, by vinyl monomers are meant monomers containing at least one carbon-carbon double bond, whether as part of vinyl, allyl, acryloyl, or any other structure.

The synthesized polymer portion may be provided from vinyl monomers providing anionic units, nonionic units, and/or cationic units.

By vinyl monomers providing nonionic units to the synthesized polymer, i.e. the synthesized polymer portion, is herein meant monomers not carrying an ionic group, or monomers that after polymerization are capable of being modified into nonionic units. Examples of vinyl monomers providing nonionic units to the synthesized polymer may be selected from the group consisting of acrylamide-based monomers, such as (meth)acrylamide, dialkylaminoalkyl (meth)acrylamides, for example dialkylaminopropyl (meth)acrylamides, hydrophobically derivatized acrylamide-based monomers such as N-tert-butylacrylamide (TBAm), N-octadecylacrylamide (ODAm), N-diphenylmethylacrylamide (DPMAm), or N-isopropylacrylamide (NIPAM); acrylate-based monomers such as alkyl (meth)acrylates, alkoxyalkyl (meth)acrylates, dialkylaminoalkyl (meth)acrylates, for example dimethylaminoethyl (meth)acrylate; N-vinylcarbamides, such as N-vinylformamide; styrene; acrylonitrile; vinyl acetate; N-vinylpyrrolidone; N-vinyl-2-caprolactam; maleic anhydride; vinylethers, such as 2-hydroxybutylvinylether; and any combinations thereof. Especially, vinyl monomers providing nonionic units to the synthesized polymer may be selected from acrylamide-based monomers.

By vinyl monomers providing anionic units to the synthesized polymer i.e. the synthesized polymer portion, is meant monomers carrying an anionic group, or a group capable of forming an anionic group, or a group capable of being modified into an anionic group. Examples of vinyl monomers providing anionic units to the synthesized polymer may be selected from the group consisting of monomers containing e.g. a carboxylic acid functional group, a sulfonic acid functional group, a phosphonic acid functional group, their corresponding water soluble or dispersible salts, and any combinations thereof. Specific examples of vinyl monomers providing anionic units to the synthesized polymer may be selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, their corresponding water soluble or dispersible alkali metal, alkaline earth metal, or ammonium salts, and any combinations thereof. In a preferred embodiment the vinyl monomers providing anionic units to the synthesized polymer portion may be selected from the group acrylic acid, its water soluble or dispersible alkali metal, alkaline earth metal, or ammonium salts, and any combinations thereof.

The polymer composition may be obtainable by polymerizing (meth)acrylamide monomers in the presence of an anionic polysaccharide to obtain a poly(meth)acrylamide, followed by a partial acid or alkali hydrolysis of the poly (meth)acrylamide, or by a derivatization such as sulfomethylation of the poly(meth)acrylamide, into an anionic copolymer of (meth)acrylamide.

The anionic units in the synthesized polymer may carry sulfonate and/or phosphonate functional groups. The anionic units carrying sulfonate and/or phosphonate functional groups may be prepared by derivatizing poly(meth)acrylamide.

The synthesized polymer portion may contain as little as 1 mole % of vinyl monomers providing anionic units to the synthesized polymer, and preferably at least 5 mole % of vinyl monomers providing anionic units to the synthesized polymer, based on the total amount of polymerizable vinyl monomers. The choice of a particular anionic polymer will be dependent upon furnish, filler, water quality, paper grade, and the like. A hydrophilic anionic polymer may be preferred.

As used herein, by anionic polymer composite is meant a polymer composite having a net anionic charge, measured at pH 8. In other words, the anionic polymer composite may originate from anionic polysaccharide, and a synthesized polymer portion provided from anionic monomers and nonionic monomers, which also may comprise units originating from cationic monomers, provided that the net charge of the anionic polymer composite (synthesized polymer with anionic polysaccharide) remains anionic. Thus, the vinyl monomers may also comprise vinyl monomers providing low amounts of cationic units to the synthesized polymer portion, provided that the net charge of the anionic polymer composite (synthesized polymer with anionic polysaccharide) remains anionic, at pH 8.

Vinyl monomers providing cationic units to the synthesized polymer may for example be selected from the group consisting of dimethylaminoethyl methacrylate (DMAEM), dimethylaminoethyl acrylate (DMAEA), diethylaminoethyl acrylate (DEAEA), diethylaminoethyl methacrylate (DEAEM), and their quaternary ammonium forms made with dimethyl sulfate or methyl chloride, Mannich reaction modified polyacrylamides, diallylcyclohexylamine hydrochloride (DACHA HCl), diallyldimethylammonium chloride (DADMAC), methacrylamidopropyltrimethylammonium chloride (MAPTAC), vinylpyridine, vinylimidazole, allyl amine (ALA), and any combinations thereof.

The vinyl monomers may also comprise vinyl monomers providing branching points to the synthesized anionic polymer, such as N,N'-methylenebisacrylam ide.

Other components, such as chain transfer agents, chelating agents, surfactants, and inorganic salts, may also be present and used, as well known by a skilled person.

According to a preferred embodiment the polymer composition comprises a copolymer of at least one anionic monomer and (meth)acrylamide, polymerized in the presence of the anionic polysaccharide.

The anionic polymer composite may have a weight ratio (dry/dry) of the anionic polysaccharide portion to the synthesized polymer portion in the range of 0.1:10-5:1, such as 0.5:10-3:1, 1:10-5:1, 1:5-2:1, 1:10-1:1, or 1:5-1:1 (dry/dry).

The polymer composition contains the synthesized polymer portion, preferably the copolymer of at least one anionic monomer and (meth)acrylamide, more preferably poly (acrylic acid-co-acrylamide), when provided in aqueous form, in an amount of about 1-40 wt %, preferably about 5-30 wt %, based on the total weight of the polymer composition. Aqueous polymer compositions having the synthetic polymer content within these ranges are easy to pump and dilute without special and costly equipment. Furthermore, the polymer compositions having the synthetic polymer content within these ranges can be delivered to the customers at a reasonable shipping cost.

The polymer composition, including the anionic polysaccharide portion of the anionic polymer composite, may, when the polymer composition is provided in aqueous form, have an anionic polysaccharide content of about 1-30 wt %, such as 1-15 wt %, 5-30 wt %, 5-15 wt %, 10-30 wt %, or 10-15 wt %, based on the total weight of the polymer composition.

The polymer composition may, when the polymer composition is provided in aqueous form, have an anionic polysaccharide content of about 1-30 wt %, such as 1-15 wt %, based on the total weight of the polymer composition. Aqueous polymer compositions having the polysaccharide content within these ranges are easy to pump and dilute without special and costly equipment. Furthermore, the polymer compositions having the polysaccharide content within these ranges can be delivered to the customers at a reasonable shipping cost.

As used herein, by anionic polysaccharide is meant an anionic polysaccharide having a net anionic charge, measured at pH 8.

As used herein, by an anionic polysaccharide is meant a polysaccharide of single type or a combination of different polysaccharides. The anionic polysaccharide may be selected from the group consisting of anionic cellulose-based polysaccharides, anionic alginate-based polysaccharides, anionic guar-based polysaccharides, anionic starch-based polysaccharides, and any combinations thereof. In a preferred embodiment the anionic polysaccharide may be selected from the group consisting of anionic cellulose-based polysaccharides, anionic starch-based polysaccharides, and any combinations thereof.

Pulp cellulose can bind strongly with cellulose-based polymers through hydrogen bonding and van der Waals forces due to their structural similarities. This strong interaction favors paper strength development. Thus, cellulose-based polysaccharides are more beneficial than many others.

The anionic cellulose-based polysaccharides may be selected from the group consisting of oxidized celluloses, phosphorylated celluloses, anionic cellulose ethers, and any combinations thereof. Suitably the anionic cellulose-based polysaccharide comprises one or more anionic cellulose ethers, especially one or more carboxymethylated celluloses.

Anionic cellulose ethers may be selected from the group consisting of carboxymethylcellulose (CMC); carboxymethylhydroxyethylcellulose (CMHEC); carboxymethyl methyl cellulose (CMMC); and any combinations thereof. A particularly preferred example of anionic cellulose ethers is carboxymethylcellulose (CMC).

Examples of anionic guar-based polysaccharides may be selected from the group consisting of carboxymethylhydroxypropyl guar (CMHPG), carboxymethyl guar (CMG), and any combinations thereof.

Examples of anionic starch-based polysaccharides may be selected from the group consisting of oxidized starch, phosphorylated starch, carboxymethylated starch, and any combinations thereof.

The anionic polysaccharide may contain hydroxyl and/or carboxyl groups. These groups are capable of interacting with cationic additives such as cationic reactive strength additives, e.g. PAE azetidinium groups, thereby further enhancing a crosslinking degree of the reactive strength additive, resulting in higher paper wet and dry strength properties.

According to a preferred embodiment the anionic polysaccharide is anionic cellulose-based polysaccharide consisting essentially of carboxymethylcellulose (CMC). This embodiment has the advantage of high compatibility with cellulosic fibers due to structural similarities, and desired interaction with the cationic additives (e.g. cationic reactive strength additives, such as PAE azetidinium groups,) due to the presence of both hydroxyl and carboxyl groups. Additionally, CMC is available in various molecular weights and anionic charge densities useful for improving paper strength.

The polysaccharide may have a Brookfield viscosity of about 1-1000 mPas, preferably 5-200 mPas, more preferably 10-100 mPas, as measured from an aqueous solution having polysaccharide content of 2 weight-% using a Brookfield LVT viscometer with a #2 spindle at 60 rpm at pH 7, 23° C. The Brookfield viscosity of the aqueous solution of the polysaccharide is proportional to the molecular weight of the polysachharide. A polysaccharide having Brookfield viscosity in the defined ranges possesses beneficial molecular weight for fixation of the composition into final paper products. Polymer fixation is a direct function of polymer molecular weight and higher molecular weight leads to greater fixation efficiency. If the polysaccharide has too low viscosity, indicating a very low molecular weight, there may be insufficient polymer fixation and consequently poor product performance. Especially the weight-average molecular weight of the anionic polysaccharide, preferably CMC, is in the range of about 50 000 Da to about 1 000 000 Da.

The anionic polymer composite may have a Brookfield viscosity of about 3-1200 mPas, preferably 7-300 mPas, more preferably 12-150 mPas, as measured from an aqueous solution of the polymer composition having solids content of 2 weight-% using a Brookfield LVT viscometer with a #2 spindle at 60 rpm at pH 7, 23° C. The Brookfield viscosity of the anionic polymer composite of the synthesized polymer portion and the anionic polysaccharide portion is proportional to the molecular weight of the polymer composite. A polymer composite of the synthesized polymer portion and the anionic polysaccharide portion having Brookfield viscosity in the defined ranges possesses beneficial molecular weight for fixation of the polymer into final paper products, and strength development. Further, the strength development may be further increased when the polymer composition comprising the anionic polymer composite when it is used together with a cationic additives (e.g. cationic reactive strength additive) applied to a papermaking process. If the Brookfield viscosity is too low, indicating a very low molecular weight, there may be insufficient polymer fixation and consequently poor product performance. And if the viscosity is too high, the polymer may cause too excessive flocculation, which is not desired for the strength development.

In general, the polymer composition has an anionic net charge, as measured by Mütek charge titration at pH 8.

The anionic polysaccharide may have an anionic charge density of about 1-10 meq/g (dry), such as 1-7.5 meq/g, 1-7 meq/g, 1-5 meq/g, or 1.5-5 meq/g (dry), as measured by Mütek charge titration at pH 8. This may also be disclosed as a charge density of about −1 to −10 meq/g (dry), such as −1 to −7.5 meq/g, −1 to −7 meq/g, −1 to −5 meq/g, or −1.5 to −5 meq/g.

The synthesized anionic polymer portion may have an anionic charge density of 0-10 meq/g (dry), such as 0.1-7 meq/g, 0.1-5 meq/g, 1-7 meq/g, or 1-5 meq/g, as calculated based on the type and amount of the vinyl monomers providing anionic units to the synthesized polymer. This may also be disclosed as a charge density of about 0 to −10 meq/g (dry), such as −0.1 to −7 meq/g, −0.1 to −5 meq/g, −1 to −7 meq/g or −1 to −5 meq/g.

Preferably CMC having the above mentioned Brookfield viscosity and anionic charge density is used. When used together with the cationic additive (e.g. cationic reactive strength additive) this provides optimal strength performance and operating window in terms of weight ratio of the cationic additive to the polymer composition.

It is to be noted that the present polymer composition comprising an anionic polymer composite provides an improved paper strength when used in paper making. Further, the present polymer composition may act to promote a cationic additive also provided to a papermaking process, to further improve and boost the cationic additive. Thus, additional increase in paper strength may be provided.

Herein is also provided a strength additive system comprising the present polymer composition and at least one cationic additive, such as cationic coagulants, cationic strength additive, or cationic reactive strength additive. The cationic additives used may be reactive.

The cationic additive may be water soluble. The cationic additive may be a cationic reactive strength additive, such as a water soluble cationic reactive strength additive. The present system is a kit of parts, which may be provided to a papermaking process. The present strength additive system may thus be used in the manufacturing of a paper product.

When the polymer composition according to the present invention is used in the manufacture of paper, board or the like, it is advantageous to add it to fibre stock with a cationic additive suitable for the papermaking process, especially with a cationic coagulant and/or a cationic strength additive, such as a cationic reactive strength additive.

Any conventional cationic additive, including inorganic cationic coagulants, and organic cationic polymers having charge density of at least 3 meq/g (dry), may be used in the method. Examples of cationic additives, such as inorganic cationic coagulants include alum and polyaluminium chlorides (PAC). Examples of organic cationic polymers having charge density of at least 3 meq/g (dry) include polymers of diallyl dimethyl ammonium chloride (DADMAC), cationic polyacrylamides, cationic polyacrylates, and polyamines, such as polyamidoamines, copolymers of dimethylamine and epichlorohydrin, or copolymers of dimethylamine, epichlorohydrin and ethylenediamine and the like. Typically, the organic cationic polymers used as cationic additives have weight-average molecular weight of at most 2 000 000 g/mol, suitably at least 20 000 g/mol, as measured by gel permeation chromatography. Preferably the cationic additive is added to the fibre stock before addition of the polymer composition to enhance the interactions of the polymer composition with the fibres. Preferably the cationic additive is added to thick stock.

When the polymer composition according to the present invention is used together with a conventional cationic additive such as a cationic strength additive, the polymer composition is able form a high number of bonds with the cationic additive, e.g. cationic strength additive, due to its polyionic nature. The polymer composition provides a high number of anionic charges capable of interacting with the cationic additive, e.g. cationic strength additive, typically cationic strength polymer. This increases the amount and strength of the bonds between the different constituents of the stock, i.e. fibres, fillers, fines, trash, chemicals, etc. The increase in interaction improves the observed strength in unexpected degree. Thus, the polymer composition can interact effectively with the cationic additive, e.g. cationic strength additive, also under high shear and/or in fibre stock having high cationic demand and/or high conductivity. According to one embodiment the cationic additive comprises cationic strength additive, such as cationic reactive strength additive.

The polymer composition and the cationic additive may be added separately to the fibre stock. The polymer composition may be added before or after, preferably after, the addition of the cationic additive. According to one embodiment the cationic additive, preferably at least onecationic reactive strength additive, is added to the fibre stock before introduction of the polymer composition. When a cationic additive is added first to the stock, a risk for strong flocculation at the addition of the polymer composition may be reduced. Preferably the cationic additive is added to the thick stock.

Any conventional cationic additive is suitable for use in the present method. For example, the cationic additive may be selected from a group comprising cationic starch and synthetic strength polymers, such as polyamidoamine-epichlorohydrin or polyethyleneimine, cationic copolymers of acrylamide and at least a cationic monomer, glyoxylated polymers, and polyvinylamines, as well as any combinations thereof. Polyvinylamines include partially or completely hydrolysed homopolymers of N-vinylformamide, partially or completely hydrolysed copolymers of N-vinylformamide and acrylic acid, as well as partially or completely hydrolysed copolymers of vinylacetate and N-vinylformamide. According to one preferable embodiment the cationic additive may comprise or be a cationic reactive strength additive. Cationic reactive strength additive may be selected from the group polyamidoamine-epichlorohydrin resins, glyoxylated polyacrylamide resins, urea formaldehyde resins, melamine formaldehyde resins, and any combination thereof. At least one cationic additive, such as the once disclosed above, e.g. for the cationic reactive strength additive, may be used in the present strength additive system and/or in a papermaking process in connection with the present polymer composition. The cationic additive may be selected from alum; polyaluminium chloride; polyvinylamine (PVAM); polyethylene imine (PEI); homopolymer or copolymer of diallyldimethylammonium chloride (DADMAC); polyamine; cationic polyacrylamide-based solution polymer; cationic starch; and cationic reactive strength additives, such as polyamidoamine-epichlorohydrin resins, glyoxalated polyacrylamide resins, urea formaldehyde resins, or melamine formaldehyde resins; and any combinations thereof.

Preferably the cationic reactive strength additive comprises or is polyamidoamine-epichlorohydrin.

The polymer composition of the strength additive system may have any of the properties already disclosed for the polymer composition.

The cationic additive, such as cationic reactive strength additive, of the strength system may have a cationic charge density in the range from 0.1-10 meq/g (dry), preferably 0.3-5 meq/g (dry), as measured at pH 7.

The charge ratio of the total cationic charge and the total anionic charge of the cationic additive and the polymer composition comprising an anionic polymer composite having a synthesized polymer portion and an anionic polysaccharide portion may be in the range of 60:1-1:60, such as 30:1-1:30, or 15:1-1:15.

The weight ratio (dry/dry) of the cationic additive, such as cationic reactive strength additive, and the polymer composition of the strength system may be in the range of 1:100-100:1, preferably 1:50-50:1, more preferably 1:20-20:1.

Herein is also provided a method of manufacturing the present polymer composition comprising the steps of:
(a) providing vinyl monomers, preferably nonionic and/or anionic vinyl monomers, such as acrylamide and acrylic acid, and an anionic polysaccharide, preferably an aqueous solution of the anionic polysaccharide;
(b) providing a mixture of said vinyl monomers, and anionic polysaccharide;
(c) providing an initiator system to the mixture and allowing the vinyl monomers to undergo polymerization to obtain the polymer composition, which comprises an anionic polymer composite having a synthesized polymer portion, such as anionic polyacrylamide, and an anionic polysaccharide portion. Preferably the vinyl monomers to undergo polymerization selected from the group anionic polymerization, cationic polymerization, and free radical polymerization. More preferably, the vinyl monomers to undergo free radical polymerization to obtain the polymer composition.

The initiator system used may be selected from a group consisting of redox initiator systems, thermal initiator systems, persulfate initiator systems, photochemical initiation systems, and ionizing radiation systems. Preferably the initiator system is selected from redox initiator systems, as when using these the radical production occurs at reasonable rates over a very wide range of temperatures, depending on the particular redox system, facilitating initiation at moderate temperatures of 0-50° C. and even lower. This may allow a greater freedom of choice of the polymerization temperature than is possible with e.g. thermal homolysis of initiators. Examples of suitable thermal initiator systems may be those comprising initiators selected from azo initiators, peroxide based initiators, and persulfate based initiators. Examples of redox initiator systems are ammonium persulfate and sodium metabisulfite, persulfate and ammonium iron sulfate, sodium chlorate and sodium metabisulfite. Examples of ionizing radiation systems may be systems using anyone of a particles, neutrons, $\beta$ rays, $\chi$ and $\gamma$ rays.

Herein is also provided a method of manufacturing a strength additive system comprising the steps of:
(i) providing the present polymer composition;
(ii) providing a cationic additive, such as cationic reactive strength additive; and
(iii) mixing the polymer composition with the cationic additive, such as cationic reactive strength additive, to provide said strength system.

In papermaking pulp is processed to a finished paper product.

"Pulp" refers typically to a fibrous cellulosic material. The pulp may also refer to cellulosic fibers, non-cellulosic polymeric fibers, and any combinations thereof. Suitable cellulosic fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemo thermochemical pulp (CTMP), alkaline peroxide mechanical pulp (APMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used. In addition to cellulosic fibers, or instead of them, the pulp may comprise non-cellulosic polymeric fibers, such as fibers of polyethylene, polypropylene, or polyester, in the form of e.g. single component or bicomponent fibers.

"Pulp furnish" refers to a mixture of pulp and water. The pulp furnish may also be referred to as pulp slurry herein. The pulp furnish is prepared in practice using water, which can be partially or completely recycled from the paper machine. It can be either treated or untreated white water or a mixture of such water qualities. The pulp furnish may contain interfering substances, such as fillers. The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers.

Herein is also provided a method of making a paper product having improved strength, preferably improved wet and dry strength, comprising providing an aqueous pulp furnish, forming a wet fiber web from the aqueous pulp furnish, and drying the wet fiber web to obtain the paper product, wherein the present polymer composition as disclosed in any embodiment above, or said polymer composition obtainable by the process disclosed herein, or the strength additive system as disclosed in any embodiment herein is added to the aqueous pulp furnish and/or on the wet fiber web.

"Paper" or "paper product" it is herein meant to encompass all types of fibre webs whether paper, paperboard, board, tissue, towel, etc.

As used herein, the terms "paper" or "paper product" is understood to include a sheet material that contains paper fibers, which may also contain other material, and it is herein meant to encompass all types of fibre webs whether paper, paperboard, board, tissue, towel, etc. Suitable paper fibers include natural and synthetic fibers, for example, cellulosic fibers, wood fibers of all varieties used in papermaking, other plant fibers, such as cotton fibers, fibers derived from recycled paper; and the synthetic fibers, such as rayon, nylon, fiberglass, or polyolefin fibers. Paperboard is a paper that is thicker, heavier, and less flexible than conventional paper.

As used herein, the terms "paper web" and "web" are understood to include both forming and formed paper sheet materials, papers, and paper materials containing paper fibers. The paper product may be a coated, laminated, or composite paper material. The paper product can be bleached or unbleached.

The aqueous pulp furnish may comprise recycled and/or virgin fibers. An enhanced strength of the paper product may allow for reduction in additive dosage, decrease of grammage on the paper product being produced, and/or increase of filler content and maintaining a desired strength of the paper. In such a way the economy of the paper manufacturing may be influenced.

As is disclosed above, the present composition may be added to the aqueous pulp furnish and/or on the wet fiber web, without the need for a cationic additive to be added before, simultaneously or subsequently, in order to provide an improved strength of the paper manufactured.

In the process of making paper a cationic additive, such as cationic reactive strength additive, may be added to the aqueous pulp furnish prior to addition of the present polymer composition, or the present composition may be added to the aqueous pulp furnish prior to addition of the cationic additive, such as cationic reactive strength additive. Alternatively, in the process of making paper a cationic additive, such as cationic reactive strength additive, may be added to on the wet fiber web prior to addition of the present polymer composition, or the present composition may be added on the wet fiber web prior to addition of the cationic additive, such as cationic reactive strength additive. Said cationic additive, such as cationic reactive strength additive, may selected from the same options as disclosed previously, e.g. polyamidoamine-epichlorohydrin.

The present polymer composition alone, as well as together with the cationic additive, such as cationic reactive strength additive, and any other additives, may be added to the papermaking process at any point in the process where strength resins are usually added. The polymer composition and the cationic additive, such as cationic reactive strength additive, may be added at any time before, during and/or after the paper is formed. For example, the polymer composition etc. may be added before, or after the refining of the pulp, at the fan pump, or at the head box, or by spraying or by other means applying the materials on the wet web. Typically, the polymer composition is added at the fan pump or machine chest in the form of an aqueous solution.

The polymer composition and cationic additive of the strength additive system may be premixed and the mixture is then added to the aqueous pulp furnish or applied onto the wet fiber web. The polymer composition and cationic additive of the strength additive system may be added separately to the aqueous pulp furnish. The polymer composition and cationic additive of the strength additive system may be added separately onto the wet fiber web. One of the polymer composition or the cationic additive of the strength system may be added to the aqueous pulp furnish and the other onto wet fiber web. At least a portion of the cationic additive may be added before the polymer composition. At least a portion of the cationic additive may be added to the pulp furnish, preferably before adding the polymer composition to the pulp furnish and/or on wet fiber web.

In an exemplary embodiment, the strength system including the polymer composition and the cationic additive, such as cationic reactive strength additive, (e.g. a resin), the individual components may be combined first and then applied to a web or fibers at a stage of the papermaking process. In another embodiment the two components, the polymer composition and the cationic additive, such as cationic reactive strength additive, may be applied sequentially in either order at the same stage of the papermaking process. In another embodiment the two components, may be applied separately but simultaneously, at the same stage of the papermaking process. After the two components have been applied to the web, the web or fibers are dried and heated to remove web moisture content below 20% in order to achieve the desired interaction between the two additives (polymer composition and the cationic additive, such as cationic reactive strength additive.

The cationic additive, such as cationic reactive strength additive, is normally supplied in liquid form, thus if a strength additive system is to comprise present polymer composition, and cationic additive, such as cationic reactive strength additive, this may be prepared in liquid form as an aqueous solution.

Herein is also provided method of making paper to enhance the strength of the paper produced comprising adding the present strength system to the aqueous pulp furnish at the wet end of the papermaking machine and forming paper from the aqueous furnish. Alternatively, the present strength additive system may be added to the wet fiber web of the papermaking process.

For example, in the present process, the polymer composition (including the present composite), may be added before, and/or simultaneously as the cationic additive, such as cationic reactive strength additive. The polymer composition, and the cationic additive, such as cationic reactive strength additive, may be added separately to the aqueous pulp furnish or onto the wet fiber web. The cationic additive, such as cationic reactive strength additive, may be added subsequent to the polymer composition.

A paper product comprising the present polymer composition or present additive system may be provided. Such a paper product may be selected from selected from towels, tissues, and boards, including packaging materials, e.g. facial tissues, hand towels, packaging boards, liner, fluting, folding boxboard (FBB), white lined chipboard (WLC), solid bleached sulphate (SBS) board, solid unbleached sulphate (SUS) board or liquid packaging board (LPB) etc.

As is indicated above the present polymer composition or the strength system may be used in the manufacture of a paper product to each provide improved strength properties to paper products.

EXAMPLES 1.1. Materials

Solution polymerized anionic polyacrylamide samples were prepared by copolymerizing acrylamide and acrylic acid. Their properties are summarized in Table 1 below. Brookfield viscosities were determined by diluting the polymer compositions to concentration of 2 weight-% with deionized water and measuring the viscosity using a Brookfield LVT viscometer with a #2 spindle at 60 rpm at pH 7, 23° C. The polysaccharide was CMC, being a commercial product with an anionic charge density of 3.6 meq/g (dry). A commercial cationic reactive strength additive was used, being a commercial wet strength PAE resin, which had a cationic charge density around 2.0 meq/g (dry) at pH 7.

TABLE 1

Sample properties

| Description | Description | Brookfield Viscosity (2%, pH 7, 23 C.), mPas | Anionic charge density (meq/g) (dry), by Mütek titration at pH 8 |
|---|---|---|---|
| Anionic polyacrylamide 1 | Poly(acrylamide-co-acrylic acid) | 13 | 1.2 |
| Anionic polyacrylamide 2 | Poly(acrylamide-co-acrylic acid) | 58 | 3.1 |
| Anionic polyacrylamide 3 | Poly(acrylamide-co-acrylic acid) | 88 | 5.3 |
| Anionic polyacrylamide 4 | Poly(acrylamide-co-acrylic acid) | 36 | 7.4 |
| CMC | | 57 | 3.6 |
| APAM polymerised in CMC | Poly(acrylamide-co-acrylic acid) polymerized in CMC solution | 43 | 3.2 |

1.2. Polymerization

Acrylamide and acrylic acid were first mixed with a CMC aqueous solution. Then, nitrogen was bubbled through the mixture to remove dissolved oxygen. Thereafter, polymerization was initiated using a redox initiator system containing ammonium persulfate and sodium metabisulfite. The final product had a solid content of 17 weight-% with 3 weight-% of CMC and 14 weight-% of poly(acrylic acid-co-acrylamide). The final product had anionic charge density of 3.2 meq/g (dry).

1.3. Handsheet Preparation

Handsheets were prepared using a recycled pulp (3.0 wt %) from a paper towel producer. Pulp dilutions during handsheet preparation were carried out using a specially formulated water to simulate papermaking mill white water. This formulated water contained 150 ppm of sodium sulfate, 35 ppm of calcium chloride, and 200 ppm alkalinity (adjusted by sodium bicarbonate). The final pH was adjusted to 7.8 using dilute hydrochloric acid and sodium hydroxide. First, the pulp suspension was diluted to 0.4 wt %. Thereafter, PAE was added to the pulp suspension at a dosage level of 40 lb per ton dry pulp (lb/ton) under agitation followed by anionic functional promoter at various dosages. After two minutes of extra mixing, four 3-g sheets of paper were formed using a standard (8"×8") Nobel & Woods handsheet mold, to target a basis weight of 52 lbs/3470 ft2. The handsheets were pressed between felts in the nip of a pneumatic roll press at about 15 psig and dried on a rotary dryer at 110° C. Then, the handsheets were further cured in a convection oven at 110° C. for additional 15 minutes. Finally, those handsheets were conditioned in the standard TAPPI control room for overnight before testing.

1.4. Dry Tensile Strength Test

Tensile strength is measured by applying a constant-rate-of-elongation to a sample and recording the force per unit width required to break a specimen. This procedure references TAPPI Test Method T494 (2001), and modified as described.

1.5. Initial Wet Tensile Strength Test

Initial wet tensile strength test method is used to determine the wet tensile strength of paper or paperboard that has been in contact with water for 2 seconds. A 1-inch wide paper strip sample is placed in the tensile testing machine and wetted on both strip sides with deionized water by a paint brush. After the contact time of 2 seconds, the strip is elongated as set forth in 6.8-6.10 TAPPI test method 494 (2001). The initial wet tensile is useful in the evaluation of the performance characteristics of tissue product, paper towels and other papers subjected to stress during processing or use while instantly wet. This method references U.S. Pat. No. 4,233,411, and modified as described.

1.6. Results and Discussion

High dosages of PAE resin convert pulp suspension net charge from anionic to cationic, leading to poor PAE retention and also various paper machine operation issues. Consequently, anionic promoters are added to enhance PAE performance and also improve paper machine operating efficiency. First, anionic functional promoters revert pulp suspensions back to net anionic and increase PAE fixation into the final paper sheet. In that way the dosage of PAE may be increased to meet even higher strength specifications. Second, the carboxylic acid groups are known to interact with PAE azetidinium groups to further enhance PAE cross-linking degree, resulting in higher paper wet and dry strength properties.

TABLE 2

Handsheet initial wet tensile strength (lb/in)

| | 0 lb/ton | 2.5 lb/ton | 5 lb/ton | 8 lb/ton | 12 lb/ton |
|---|---|---|---|---|---|
| APAM 1 | 6.7 | 6.6 | 8.1 | 8.4 | NA |
| APAM 2 | 6.7 | 8.4 | 8.7 | 8.1 | 7.9 |
| APAM 3 | 6.7 | 8.7 | 8.1 | 7.8 | NA |
| APAM 4 | 6.7 | 7.4 | 7.4 | NA | NA |
| APAM polymerised CMC | 6.7 | NA | 9.1 | 8.7 | 9.1 |

Table 2 shows that all tested anionic promoters were able to increase paper wet tensile strength. Furthermore, paper wet strength was a function of both promoter dosage and promoter charge density at a fixed PAE dosage. The optimal wet strength was obtained at an intermediate promoter dosage. If the dosage was too low or too high, wet strength decreased significantly. Meanwhile, the higher charge density promoters had a lower optimal dosage level. For example, 12 lb/ton of APAM sample 1 (−1.2 meq/g (dry)) were applied to increase wet tensile strength to 8.5 lb/in, whereas only 2.5 lb/ton of APAM sample 3 (−7.4 meq/g (dry)) was required to increase wet tensile to 8.7 lb/in. In summary, all conventional APAM samples had a rather narrow operating window in terms of weight ratio of PAE to anionic synthetic promoter dosage. In commercial paper production, papermakers have to adjust numerous operating parameters in order to optimize sheet properties and also paper machine productivity. This narrow PAE/anionic synthetic polymer dosage range will present extra challenges for papermakers to achieve desired sheet strength properties.

Table 2 also demonstrates that APAM polymerised in CMC according to the invention provided consistently higher wet tensile strength with a much broader operating window. Over a dosage range from 5 to 12 lb/ton, the wet tensile strength remained at around 9 lb/in. Paper manufacturers will be able to reach the optimal strength properties rather easily with the present invention. This new polymer composition was produced in a liquid solution form which can be applied to paper machines directly after a simple dilution step. In comparison, CMC is commonly supplied in dry form so expensive and large make down units and manpower are required to dissolve CMC before being applied to the paper machine. Additionally, the new polymer composition surprisingly presented essentially no signs of microbiological deterioration upon visual inspection, such as turbidity increase or change in viscosity, after storage at room temperature for several weeks.

2.1. Preparation of Additional Composite Materials and Testing of Performance

A series of APAM products were polymerized in CMC and their properties are listed in Table 3. Their strength performance were tested using a 3.0% virgin pulp suspension (50% bleached hardwood and 50% bleached softwood) with a Canadian Standard Freeness of 450 mL. Pulp dilutions during handsheet preparation were carried out using a specially formulated water to simulate papermaking mill white water. This formulated water contained 150 ppm of sodium sulfate, 35 ppm of calcium chloride, and 200 ppm alkalinity (adjusted by sodium bicarbonate). The final pH was adjusted to 7.8 using dilute hydrochloric acid and sodium hydroxide. First, the pulp suspension was first diluted to 0.4 wt %. Thereafter, 25 lb/ton of cationic additive, here PAE, was added to the pulp suspension under agitation followed by 5 lb/ton of present polymer composition, which here is able to also promote the cationic additive included. Pulp suspension "alone" or "without CMC and APAM" was used as blank. After two minutes of extra mixing, four 3-g sheets of paper were formed using a standard (8"×8") Nobel & Woods handsheet mold, to target a basis weight of 52 lbs/3470 ft2. The handsheets were pressed between felts in the nip of a pneumatic roll press at about 15 psig and dried on a rotary dryer at 110° C. Then, the handsheets were further cured in a convection oven at 110° C. for additional 15 minutes. Finally, those handsheets were conditioned in the standard TAPPI control room for overnight before testing.

TABLE 3

Properties and performance of APAM polymerized in CMC

| | CMC/APAM weight ratio | Charge (meq/g) (dry) | Initial wet tensile strength (lb/in) |
|---|---|---|---|
| Blank | NA | NA | 7.8 |
| Example 1 | 0.21 | −3.2 | 10.0 |
| Example 2 | 0.38 | −3.7 | 10.6 |
| Example 3 | 0.61 | −2.8 | 11.8 |
| Example 4 | 0.61 | −3.2 | 10.9 |
| Example 5 | 0.61 | −3.7 | 11.2 |

As shown in Table 3, all Examples enhanced wet tensile strength significantly.

The invention claimed is:

1. A polymer composition comprising an anionic polymer composite having a synthesized polymer portion and an anionic polysaccharide portion, obtainable by polymerizing vinyl monomers in the presence of an anionic polysaccharide, wherein said anionic polymer composite has a weight ratio of the anionic polysaccharide portion to the synthesized polymer portion in the range of 0.1:10-5:1 (dry/dry).

2. The polymer composition according to claim 1, having a solids content originating from the anionic polymer composite of about 1-50 wt %, based on the total weight of the polymer composition.

3. The polymer composition according to claim 1, wherein the anionic polymer composite has a Brookfield viscosity of about 3-1200 mPas, when measured from an aqueous solution of the polymer composition having solids content of 2 weight-% using a Brookfield LVT viscometer with a #2 spindle at 60 rpm at pH 7, 23° C.

4. The polymer composition according to claim 1, wherein said vinyl monomers providing nonionic units to the synthesized polymer portion of the composite are selected from the group consisting of acrylamide-based monomers, acrylate-based monomers, N-vinylcarbamides, styrene, acrylonitrile, vinyl acetate, N-vinylpyrrolidone, N-vinyl-2-caprolactam, maleic anhydride, vinylethers, and combinations thereof.

5. The polymer composition according to claim 1, wherein said vinyl monomers providing anionic units to the synthesized polymer portion of the composite are selected from the group consisting of monomers containing a carboxylic acid functional group, a sulfonic acid functional group, a phosphonic acid functional group, their corresponding water soluble or dispersible salts, and combinations thereof.

6. The polymer composition according to claim 1, wherein said anionic polysaccharide is selected from the group consisting of anionic cellulose-based polysaccharides, anionic alginate-based polysaccharides, anionic guar-based polysaccharides, anionic starch-based polysaccharides, and combinations thereof.

7. The polymer composition of claim 1, wherein the anionic cellulose-based polysaccharides are selected from the group consisting of carboxymethylcellulose (CMC), carboxymethylhydroxyethylcellulose (CMHEC), carboxymethyl methyl cellulose (CMMC), and combinations thereof; or the anionic cellulose-based polysaccharides are selected from the group consisting of anionic cellulose-based polysaccharides consisting essentially of carboxymethylcellulose (CMC).

8. The polymer composition according to claim 1, wherein the vinyl monomers providing anionic units to the synthesized polymer portion of the composite are selected from the group consisting of:

(i) acrylamide based monomers;
(ii) acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, their corresponding water soluble or dispersible alkali metal, alkaline earth metal, or ammonium salts, and combinations thereof; or
(iii) acrylic acid, its water soluble or dispersible alkali metal, alkaline earth metal, or ammonium salts, and combinations thereof.

9. The polymer composition according to claim 1, having a solids content originating from the anionic polymer composite of about 10-30 wt %, based on the total weight of the polymer composition.

10. The polymer composition according to claim 1, wherein the anionic polymer composite has a Brookfield viscosity of about 12-150 mPas, when measured from an aqueous solution of the polymer composition having solids content of 2 weight-% using a Brookfield LVT viscometer with a #2 spindle at 60 rpm at pH 7, 23° C.

11. The polymer composition according to claim 1, wherein the anionic polymer composite has a weight ratio of the anionic polysaccharide portion to the synthesized polymer portion in the range of 0.5:10-3:1 (dry/dry).

12. The polymer composition according to claim 1, wherein the anionic polymer composite has a weight ratio of the anionic polysaccharide portion to the synthesized polymer portion in the range of 1:10-1:1 (dry/dry).

* * * * *